US006760476B2

(12) United States Patent
Meder

(10) Patent No.: US 6,760,476 B2
(45) Date of Patent: Jul. 6, 2004

(54) METHOD OF CHECKING LOTTERY TICKET NUMBERS

(76) Inventor: Martin G. Meder, 1415 Locust Ave., Blacksburg, VA (US) 24060

( * ) Notice: Subject to any disclaimer, the term of this patent is extended or adjusted under 35 U.S.C. 154(b) by 549 days.

(21) Appl. No.: 09/777,102

(22) Filed: Feb. 5, 2001

(65) Prior Publication Data

US 2001/0033689 A1 Oct. 25, 2001

Related U.S. Application Data

(60) Provisional application No. 60/180,817, filed on Feb. 7, 2000, and provisional application No. 60/215,722, filed on Jul. 3, 2000.

(51) Int. Cl.[7] .................................................. G06K 9/00
(52) U.S. Cl. ....................................................... 382/181
(58) Field of Search ................................ 382/181, 182, 382/183, 200, 218, 112, 140; 379/93.13; 463/17; 345/620, 625

(56) References Cited

U.S. PATENT DOCUMENTS 5,417,424 A * 5/1995 Snowden et al. ............. 463/18
6,199,044 B1 * 3/2001 Ackley et al. .............. 704/275
6,357,658 B1 * 3/2002 Garczynski et al. ... 235/462.01
6,561,428 B2 * 5/2003 Meier et al. ........... 235/462.25

* cited by examiner

*Primary Examiner*—Andrew W. Johns
*Assistant Examiner*—Shervin Nakhjavan
(74) *Attorney, Agent, or Firm*—Martin G. Meder

(57) ABSTRACT

The invention allows a purchaser of lottery tickets to scan multiple lottery tickets at once, send the resulting image to a web site, where the web site will indicate to the purchaser whether any of the tickets are winners and also highlight on the image for the purchaser the location of a winning ticket in the image and also highlight where on the ticket the winning number is. The method for checking lottery tickets comprises the steps of digitizing at least one lottery ticket comprising lottery numbers to form an image, performing optical character recognition on the image to obtain the lottery numbers, comparing the lottery ticket lottery numbers to at least one winning lottery number and reporting the winning status of the at least one lottery ticket.

20 Claims, 1 Drawing Sheet

METHOD OF CHECKING LOTTERY TICKET NUMBERS

RELATED APPLICATIONS

This application claims benefit of provisional applications Ser. No. 60/180,817, filed on Feb. 7, 2000 and Ser. No. 60/215,722, filed on Jul. 3, 2000.

FIELD OF THE INVENTION

This invention relates to lottery tickets.

BACKGROUND OF THE INVENTION

The Pennsylvania State lottery game “Super 6 Lotto”, is exemplary of many. If one were to purchase a $5 ticket, one would receive a ticket with 15 groups of numbers, each group containing six numbers, for a total of 90 numbers, the numbers within each group being selected from 1 through 69. Of course, if all six of the numbers in one group later match the winning 6 numbers, the ticket purchaser is a winner. The ticket purchaser is also a winner if 3, 4 or 5 of the numbers within a group match any of the winning numbers. Comparing the numbers in the ticket to the winning numbers can become tedious, especially if, for example, a group of individuals working together decide to pool their ticket purchases. Ten $5 tickets would have 900 numbers to check. The designated ticket checker could waste upwards of an hour determining if a ticket is a winner. State lotteries fund many worthwhile causes, but the mathematical permutations and combinations required to check if a ticket is a winner is unpleasantly work-like to many individuals and inhibits ticket sales.

SUMMARY

The invention includes a method for checking lottery tickets comprising the steps of digitizing at least one lottery ticket comprising lottery numbers to form an image, performing optical character recognition (OCR) on the image to obtain the lottery numbers, comparing the lottery ticket lottery numbers to at least one winning lottery number and reporting the winning status of the at least one lottery ticket.

In a preferred embodiment, the invention allows a purchaser of lottery tickets to scan multiple lottery tickets at once, send the resulting image to a web site, where the web site will indicate to the purchaser whether any of the tickets are winners and also highlight on the image for the purchaser the location of a winning ticket in the image and also highlight where on the ticket the winning number is.

DETAILED DESCRIPTION OF THE INVENTION

Figure 1:
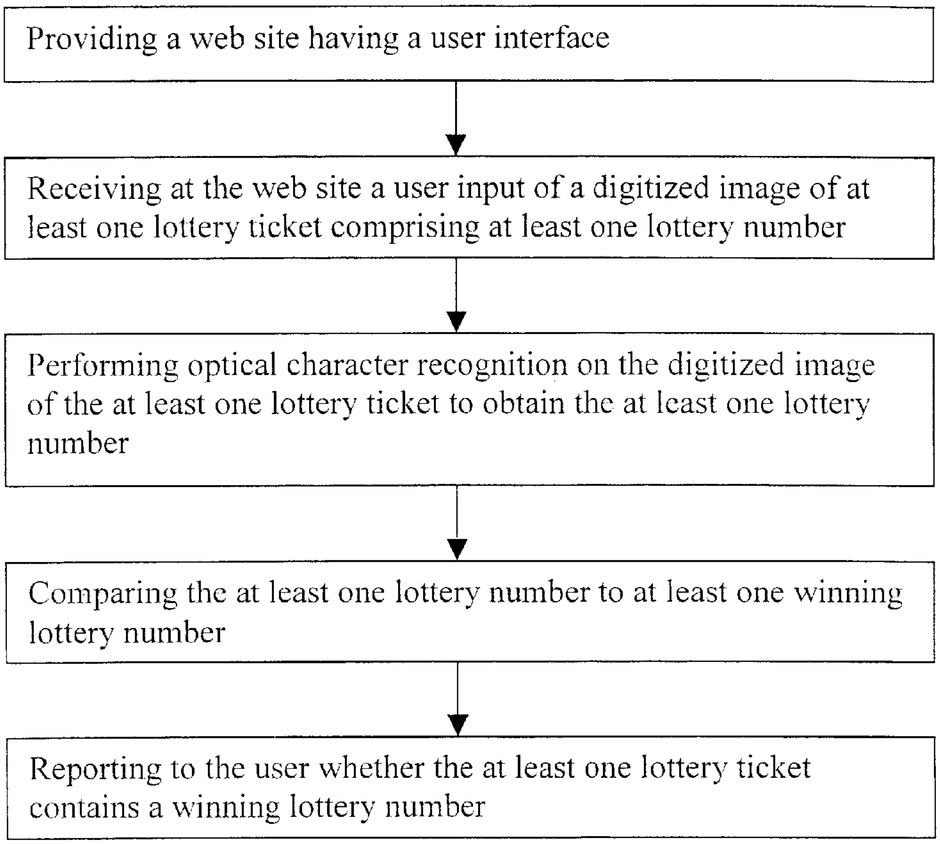
FIG. 1 is a flowchart describing one embodiment of the invention.

The present invention provides the ability to scan multiple lottery tickets from various states, dates, and types of contests and to rapidly determine which ticket, if any, has a winning number and where in the ticket that number is. A user would scan one or more tickets to form a digital image, The digital image is then subject to an optical character recognition program to extract the lottery numbers, dates, states, and type of bet (depending on the game), the resulting information is compared to a database of winning numbers, and the user is presented with a report, that advises the user whether he has won. In a particularly preferred embodiment, the user is presented with a report that takes the form of the original image, but altered so that any winning tickets are displayed in a highlighted fashion, such as by circling the ticket, making the numbers bold, underlining, changing the text or the background color and the winning numbers within the ticket may also be highlighted. In this way, the user can select the winning ticket or tickets right off the scanner bed to present for payment, and discard the losing tickets.

FIG. 1 is a flowchart describing one embodiment of the invention.

The daily change of lottery numbers lends itself well to Internet-based applications. An Internet-based method could, for example, comprise the following steps: providing a web site having a user interface, receiving at the web site a user input of a digitized image of at least one lottery ticket comprising at least one lottery number, performing optical character recognition on a digitized image of the at least one lottery ticket to obtain the at least one lottery number in a computer usable form, comparing the at least one lottery number to at least one winning lottery number, reporting to the user whether the at least one lottery ticket contains a winning number.

In an embodiment of the invention, a user emails a digitized image of at least one lottery ticket to a website, the website applies OCR software to the image, compares the ticket numbers, ticket dates, state identification, type of game, and the like to a database of winning numbers and either: 1) emails the user back, reporting whether he has won, and if the user has won, reporting which ticket (by date, first number, last number or image highlighting, for example) and which number in the ticket, or 2) emailing to the user a link to the website where the user may view the results. The second method is preferred because some email systems can’t handle large image files well and because the user can be presented with advertising.

In another embodiment, the website stores the image sent by the user on a computer readable medium after OCR and it has been determined that the date on at least one of the tickets indicates that the lottery has not yet occurred. Once the lottery has occurred, the user is then sent an email.

In another embodiment, the state identification(s) of the lottery tickets presented from a given email address is(are) stored on a computer readable medium and used to speed the analysis of subsequent tickets presented from the same email address, the state lottery number comparisons being selected first from the states lotteries the email sender has used in the past.

In another embodiment, winning users are charged a fee for the identification of a winning number. This can be a flat fee or a percentage of the winnings. The fee may be charged, for example, for multiple tickets presented in an email (while single tickets are done for free), or after the user has had a trial time period or used the website a certain number of times.

In another embodiment the user is told how much he has won, and optionally, how much fee the user is being charged.

In yet another embodiment, the user is registered. This is done by either prompting at the receipt of an email, (either the first time or after a certain number of uses), or when visiting the website. Registration information can comprise the user’s email address, credit card information for billing and the state lotteries the user uses most frequently. Preferably, a cookie is planted in the user’s computer for ease of ingress and identification when the user responds to an email with an embedded link directing the user to the website.

The digitized image may be provided by a scanner, such as a flatbed scanner, a facsimile machine or a digital camera. The format of the digitized image may be GIF, JPEG, BMP, EPS, PIC, PNG, TIFF or any other standard. It is particularly preferred to digitize a plurality of tickets simultaneously.

Optical character recognition is then performed on the image to obtain the lottery numbers. Obtaining the date can be optional, as in the absence of a date it can be assumed that the date of the most recent lottery is intended. Similarly, obtaining the information about which is the state of origin of a ticket is optional in the case where the web site is that of a given state's lottery commission, in that it can safely be presumed that users of such a site will only submit tickets from that state. Note that state of origin information is sometimes provided symbolically rather than in alphanumeric form. For example, Pennsylvania lottery tickets contain the image of a keystone to indicate state origin. Information about the type of bet, such as boxed or straight, will only be required for games that allow it. Ideally, the optical character recognition program accommodates as many popular image formats as possible. OCR programs are readily available.

The lottery number information, and other information, obtained from the lottery tickets is compared to the winning number or numbers for the corresponding state, date, game, and type of bet. The winning numbers may be obtained by sending intelligent agents out over the Internet to search state lottery or commercial web sites, or from telephone hotlines, or news programs and the like. As such numbers are collected, they can be archived on a computer readable storage medium such as magnetic media such as a hard drive or a disc, optical media such as read-write CD-ROM, semiconductor media such as random access memory, and the like for fast retrieval.

A report is then issued to the user, advising the user whether there was a winning number. Preferably, the user is also advised as to which number it was. In a particularly preferred embodiment, the image originally provided by the user is displayed with the winning number indicated by highlighting in some fashion such as underlining, circling the number, making it bold, or changing the text of the winning number or background color behind the number to locate the position of the winning number within the image. If more than one ticket was scanned, then the winning ticket may also be so highlighted.

In yet another embodiment of the invention, the user's computer can be outfitted with the software for character recognition and also for sending out intelligent agents to one or more state or commercial web sites to find winning numbers for comparison and results reporting, without the aid of a web site providing the service.

In yet another embodiment of the invention, the user's computer can be outfitted with the software for character recognition. The user then not only digitizes the lottery ticket, but also performs optical character recognition on the digitized image to extract information from the lottery ticket(s) such as lottery numbers, date, type of bet and state. Information from the lottery ticket is then forwarded to the website by, for example, e-mail.

Although various embodiments of the invention are shown and described herein, they are not meant to be limiting, for example, those of skill in the art may recognize certain modifications to these embodiments, which modifications are meant to be covered by the spirit and scope of the appended claims.

I claim:

1. An Internet-based method comprising the following steps:

providing a web site having a user interface;

receiving at the web site a user input of a digitized image of at least one lottery ticket comprising at least one lottery number;

performing optical character recognition on the digitized image of the at least one lottery ticket to obtain the at least one lottery number;

comparing the at least one lottery number to at least one winning lottery number; and reporting to the user whether the at least one lottery ticket contains a winning lottery number.

2. The method of claim 1, wherein the digitized image is provided by at least one of a digital camera and a scanner.

3. The method of claim 1, wherein a plurality of lottery tickets are simultaneously digitized.

4. The method of claim 1, wherein the step of performing optical character recognition also obtains the date of the lottery ticket.

5. The method of claim 1, wherein the step of performing optical character recognition also obtains the state of origin of the lottery ticket.

6. The method of claim 1, wherein the step of performing optical character recognition obtains the type of bet placed.

7. The method of claim 1, wherein the comparing of the lottery ticket lottery numbers to the at least one winning lottery number is done by sending out at least one intelligent agent on the Internet to search for the at least one winning lottery number.

8. The method of claim 1, wherein the reporting of the winning status indicates which lottery numbers have won.

9. The method of claim 1, wherein the reporting of the winning status indicates the location within the image of the at least one lottery ticket of which lottery numbers have won.

10. The method of claim 1, wherein the reporting of the winning status indicates the location within the image of the lottery tickets that have won, in the case of a plurality of lottery tickets being simultaneously imaged.

11. A computer-readable storage medium containing computer executable code for instructing a computer to operate as follows:

receive a user input of a digitized image of at least one lottery ticket comprising at least one lottery number;

perform optical character recognition on the at least one lottery ticket to obtain the at least one lottery number;

compare the at least one lottery number to at least one winning lottery number; and report to the user whether the at least one lottery ticket contains a winning lottery number.

12. The method of claim 11, wherein a plurality of lottery tickets are simultaneously digitized.

13. The method of claim 11, wherein the optical character recognition also obtains the date of the lottery ticket.

14. The method of claim 11, wherein the optical character recognition also obtains the state of origin of the lottery ticket.

15. The method of claim 11, wherein the optical character recognition obtains the type of bet placed.

16. The method of claim 11, wherein the comparison of the lottery ticket lottery numbers to the at least one winning lottery number is done by sending out at least one intelligent agent on the Internet to search for the at least one winning lottery number.

17. The method of claim 11, wherein the report of the winning status indicates which lottery numbers have won.

18. The method of claim 11, wherein the report of the winning status indicates the location within the image of the at least one lottery ticket of which lottery numbers have won.

19. The method of claim 11, wherein the report of the winning status indicates the location within the image of the lottery tickets that have won, in the case of a plurality of lottery tickets being simultaneously imaged.

20. An Internet-based method comprising the following steps:

providing a web site having a user interface;

performing optical character recognition on the digitized image of at least one lottery ticket to obtain at least one lottery number;

receiving at the web site a user input of at least one lottery number;

comparing the at least one lottery number to at least one winning lottery number; and reporting to the user whether the at least one lottery ticket contains a winning lottery number.

* * * * *